United States Patent
Venkata et al.

(10) Patent No.: US 9,690,741 B2
(45) Date of Patent: Jun. 27, 2017

(54) CONFIGURATION VIA HIGH SPEED SERIAL LINK

(71) Applicant: Altera Corporation, San Jose, CA (US)

(72) Inventors: Ramanand Venkata, Fremont, CA (US); Gopi Krishnamurthy, Tracy, CA (US)

(73) Assignee: Altera Corporation, San Jose, CA (US)

( * ) Notice: Subject to any disclaimer, the term of this patent is extended or adjusted under 35 U.S.C. 154(b) by 710 days.

(21) Appl. No.: 13/942,532

(22) Filed: Jul. 15, 2013

(65) Prior Publication Data

US 2015/0019777 A1    Jan. 15, 2015

(51) Int. Cl.
  *G06F 13/40*    (2006.01)
  *G06F 13/42*    (2006.01)

(52) U.S. Cl.
  CPC ...... *G06F 13/4068* (2013.01); *G06F 13/4282* (2013.01)

(58) Field of Classification Search
  CPC .. G06F 13/40; G06F 13/4068; G06F 17/5045; G06F 13/4282
  See application file for complete search history.

(56) References Cited

U.S. PATENT DOCUMENTS

| | | | | |
|---|---|---|---|---|
| 5,978,862 A * | 11/1999 | Kou | ............ | G06F 13/387 710/14 |
| 7,426,597 B1 * | 9/2008 | Tsu | ............ | G06F 13/4018 710/29 |
| 7,626,418 B1 * | 12/2009 | Kolze | ............ | H03K 19/17732 326/39 |
| 8,917,111 B1 * | 12/2014 | Puranik | ............ | H03K 19/17748 326/38 |

OTHER PUBLICATIONS

Altera Corporation, "FPGA Configuration Via Protocol White Paper", May 2011.*
Altera Corporation, "Configuring Arria GX Devices," Arria GX Device Handbook, vol. 2, May 2008.
Altera Corporation, "Configuration and Remote System Upgrades in Cyclone IV Devices," Cyclone IV Device Handbook, vol. 1, May 2013.
Altera Corporation, "Configuring Stratix & Stratix GX Devices," Stratix GX Device Handbook, vol. 3, Jul. 2005.

* cited by examiner

*Primary Examiner* — Tim T Vo
*Assistant Examiner* — Phong H Dang
(74) *Attorney, Agent, or Firm* — Fletcher Yoder, P.C.

(57) ABSTRACT

Mechanisms and techniques for configuring a configurable slave device using a high speed serial link where a different number of lanes of the high speed serial link are used to send data between the slave device and a master device, depending on whether the slave device is in configuration mode or in normal operations mode, are provided.

22 Claims, 6 Drawing Sheets

CONFIGURATION VIA HIGH SPEED SERIAL LINK

FIELD OF THE INVENTION

The present disclosure relates generally to configuration of integrated circuits, and, more particularly, to techniques and mechanisms for configuring integrated circuits over high speed serial links.

BACKGROUND

As computer systems have evolved, the ability to transfer data at high speeds has become increasingly important. One development that has aided that goal is the use high speed serial connections. Such high speed serial links are often implemented as a group of lanes, each lane used to transport a portion of data between two devices. Dividing data into sub-blocks, and sending each sub-block over a different high speed serial lane, allows for scalable high bandwidth.

One context in which high speed serial interfaces can be useful is serving as connections between a master device and a slave configurable device. Examples of such slave configurable devices include Field Programmable Gate Arrays (FPGAs) and Programmable Logic Device (PLDs). Such devices contain hardware capable of being configured in different ways, thus permitting a user to implement different designs without having to undergo a lengthy and expensive process required for designing and fabricating hardware to perform different functions.

Various embodiments of the present disclosure seek to improve upon techniques and mechanisms for configuring an integrated circuit using high speed serial links.

BRIEF DESCRIPTION OF THE DRAWINGS

Techniques and mechanisms are provided for configuring an integrated circuit using high speed serial links.

These techniques and mechanisms, together with other features, embodiments, and advantages of the present disclosure, may best be understood by reference to the following description taken in conjunction with the accompanying drawings, which illustrate various embodiments of the present techniques and mechanisms. In the drawings, structural elements having the same or similar functions are denoted by like reference numerals.

DESCRIPTION OF PARTICULAR EMBODIMENTS

Overview

Techniques and mechanisms for configuring an integrated circuit using high speed serial links is described.

According to an embodiment of the present disclosure, a method for configuring a configurable slave device using high speed serial links where a different number of lanes are utilized depending on whether the slave device is in configuration mode or in normal operations mode, is provided. In one embodiment, a method for configuring a device using a high speed serial link is provided. A slave device negotiates a first high speed serial link containing a first number of high speed serial lanes with a master device for use during a first configuration mode. The slave device receives configuration data from the master device over the first high speed serial link and uses that configuration data to configure distributed configuration blocks in the slave device. After configuration is complete, the slave device negotiates a second high speed serial link containing a second number of high speed serial lanes between the master device and the slave device during a first operations mode. The slave device exchanges data with the master device over the second high speed serial link while the slave device performs a function for which the slave device has been configured. The first number of high speed serial lanes is smaller than the second number of high speed serial lanes.

The foregoing, together with other features, embodiments, and advantages of the present disclosure, will become more apparent when referring to the following specification, claims, and accompanying drawings.

Example Embodiments

As noted above, one context in which the use of high speed serial links can be useful is in communications between a master device and a slave configurable device.

One example of a protocol that can be used to create such high speed serial links is PCI Express, an architecture developed by Intel Corporation for creating high speed data links. Other examples of protocols for high speed serial links are Ethernet, Serial RapidIO (SRIO), and Interlaken. PCI Express is discussed in describing embodiments of the present application, as PCI Express is a commonly used protocol, but it should be understood that the invention is not limited to systems using the PCI Express protocol. The present invention could be used in connection with any system utilizing high speed serial links to configure a slave device, or even, any system in which a master device and a slave device are connected by a link composed of different lanes or sub-links, for example, Hyper/Transport.

To provide some background, a PCI Express system, for example, provides data transfer connections based on a serial physical-layer communications protocol. The physical-layer consists not of a conventional bus, but of a network of serial interconnections which extend to each PCI Express adapter from a PCI Express root complex. The PCI Express root complex is a computer hardware chipset that handles communications between the components of a computer system, and can include a host bridge for communicating with one or more computer processors. The PCI Express root complex can also include a number of ports that each provides data communication with a port on a PCI Express device.

A connection between any two PCI Express ports is referred to as a "link". A link consists of a collection of one or more lanes used for data communications between PCI Express devices. Each lane is a set of two unidirectional low voltage differential signaling pairs of transmission pathways. Because transmitting data and receiving data are implemented using separate differential pairs, each lane allows for full-duplex serial data communication. The ability to combine several lanes together to form a link allows PCI Express technology to provide scalable bandwidth.

As noted above, various embodiments of the present application provide techniques and mechanisms for configuring slave configurable devices using high speed serial links, such as PCI Express.

The embodiments of the present invention described below are not meant to limit the scope of the present invention.

It will be understood that various specific features of the described implementation may be varied without departing from the spirit of the present invention. Moreover, it will be understood that various features of different implementations described in this disclosure may be combined in another embodiment.

Figure 1:
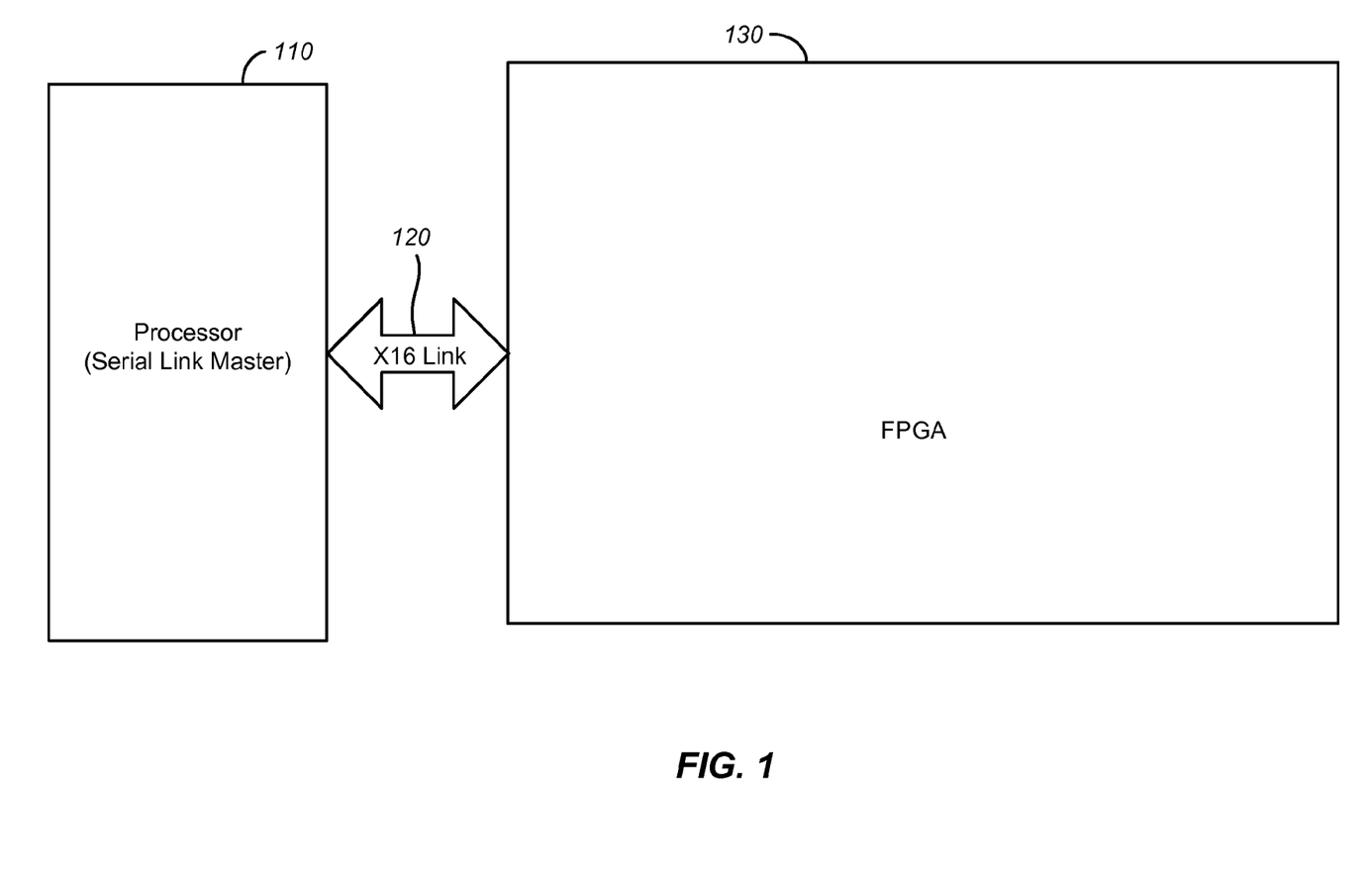
FIG. 1 is a simplified block diagram of a master device and a slave configurable device according to an embodiment of the present disclosure.

FIG. 1 is a simplified block diagram showing an example embodiment of a high speed serial link system connecting a master device to a slave device.

As shown in FIG. 1, master device 110 is connected via a high speed serial link 120 to slave configurable device 130.

Master device 110 may include a PCI Express root complex. Master device 110 may also function as a user device.

The high speed serial link 120 may include a group of lanes, each of which consists of a set of two unidirectional low voltage differential signaling pairs of transmission pathways, for example. In one embodiment, data can be transmitted and received data using separate differential pairs; therefore, each lane can allow for full-duplex serial data communication. FIG. 1 shows serial link 120 having sixteen lanes—Lane0 through Lane16. For purposes of description, this link will be discussed as being formed based on PCI Express protocol.

When a PCI Express high speed serial link is formed, the two devices connected by the link may negotiate to determine the number of lanes in the serial link that the devices will use to communicate. A link width may be selected based, for example, on the amount of processor or memory resources which the devices have available to receive or send the data to be transmitted over the link.

Generally, during normal use of slave device 110 and master device 130, it is desirable to negotiate the highest possible bandwidth link—that is, that will utilize the most possible lanes of the link—as long as the slave and master devices can receive/send data at that bandwidth. This is because such use provides the fastest performance.

Thus, if both master device 110 and slave device 130 are capable (for example, in terms of available memory or processor resources) of handling a maximum bandwidth that high speed serial link 120 can provide, typically, they will negotiate to create a connection over serial link 120 that utilizes all sixteen lanes of serial link 120. That is they will negotiate to send and receive data using the full lane width of serial link 120.

Where a PCI Express system is being used to handle communications between a master device and a slave configurable device, it will frequently be responsible for transporting configuration data, that is, instructions for configuring the slave device, as well as working data, that is, the data transmitted between the master device and slave device once configuration of the slave device has been completed, and the master device and slave device are communicating in the course of normal operations.

The inventors realized that Field Programmable Gate Arrays (FPGAs) and other devices that are configurable, face a particular challenge when a serial link containing a large number of lanes is used for transmitting configuration data between master device 110 and slave configurable device 130. As described below, receiving configuration data on a large number of lanes of a serial link can raise problems for slave configurable device 130.

Figure 2:
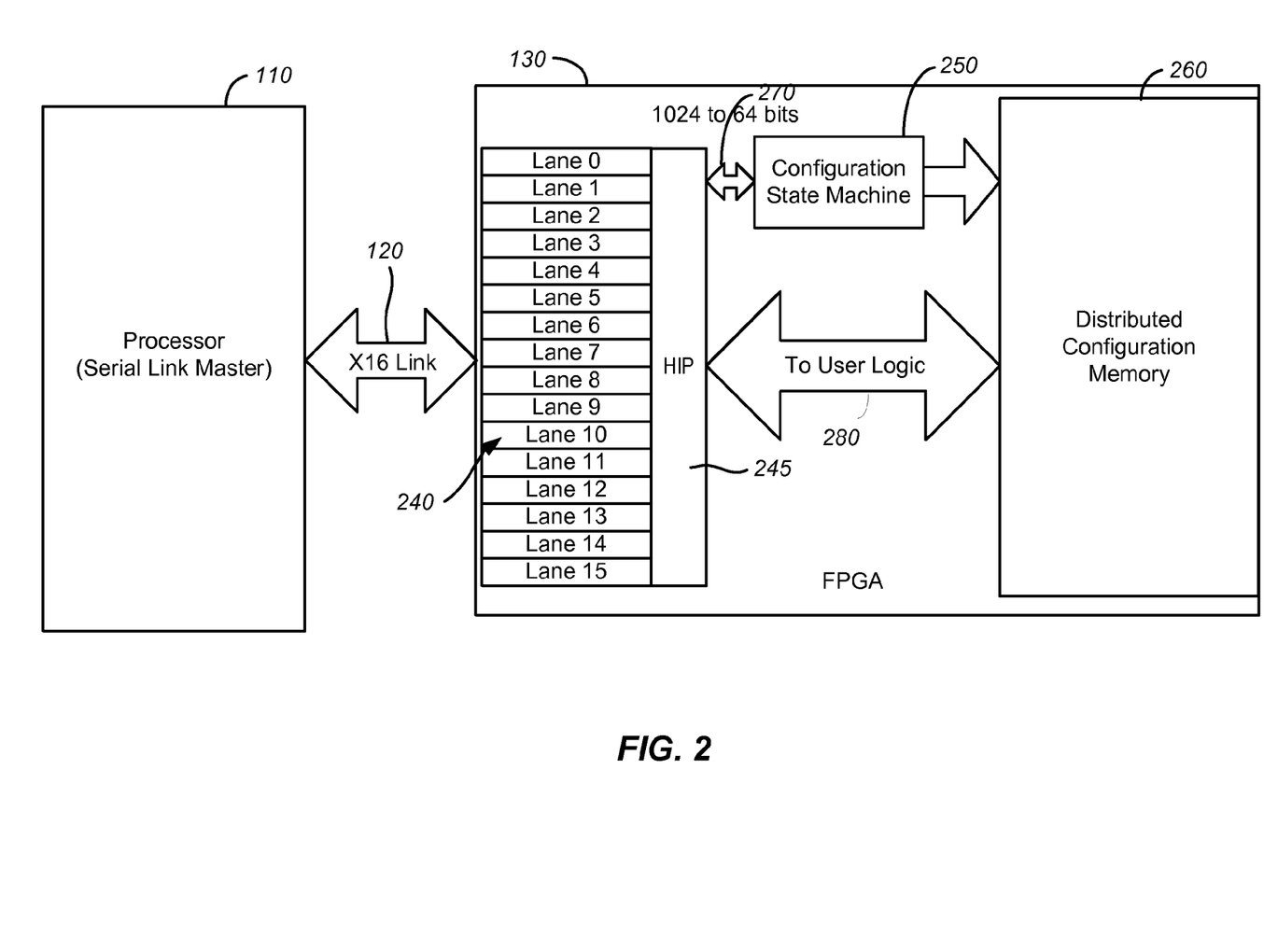
FIG. 2 is a simplified block diagram of a master device and a slave configurable device according to an embodiment of the present disclosure.

FIG. 2 is a simplified block diagram showing an example embodiment of a high speed serial link system connecting a master device to a slave device. This Figure shows further detail regarding slave device 130.

As shown in FIG. 2, the data sent by master device 110 over serial link 120 is received by slave device 130 at high speed serial interface (HSSI) 240. HSSI is an interface developed to address the needs of high speed interfaces. HSSI 240 then, in one embodiment, passes the data to hard IP (HIP) block 245. HIP takes the data and processes it into a form capable of being used by slave device 130. This may involve, among other things, taking sub-blocks of data separated for purposes of transmission over high speed serial link 120, and putting them back into a proper sequence for use by the slave device.

After processing the data, HIP 245 then sends the data onto configuration state machine 250. It is configuration state machine 250 that actually uses configuration data sent by master device 110 to configure distributed configuration memory 260 of slave configurable device 130. That is, configuration state machine 250 is responsible for taking configuration data sent by master 110 and using it to program distributed configurable memory 260 of slave device 130, so that slave device 130 can perform the desired functions.

Then, after slave device 130 has been configured to perform a particular function, communication link(s) 280 are used to transmit data between now configured distributed memory 260 and master device 110 as they interact in the course of normal operations.

Figure 3:
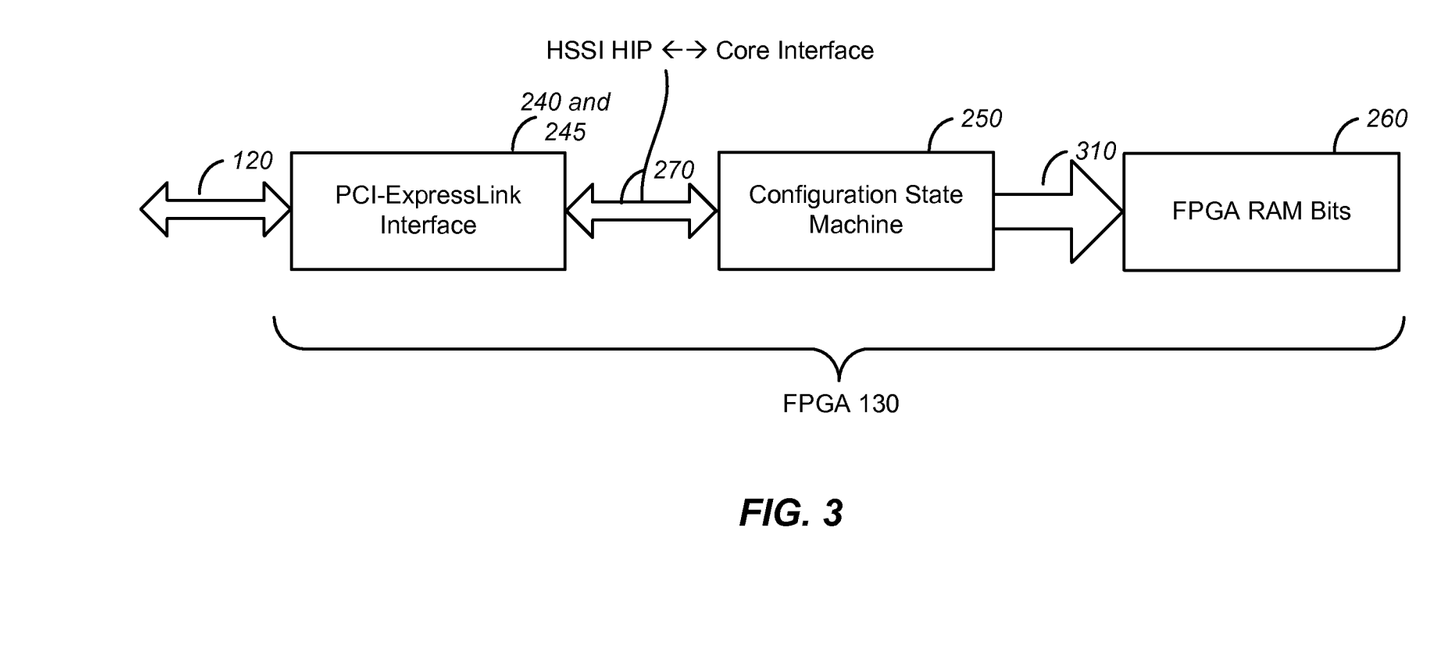
FIG. 3 is a simplified block diagram of a slave configurable device according to an embodiment of the present disclosure.

FIG. 3 is a simplified block diagram showing the interaction between (a) the HSSI 240 and HIP 250 block, which serves as the interface between high speed serial link 120 and slave configurable device 130, (b) configuration state machine 250 and (c) distributed configurable memory 260 of slave device 130. Importantly, the PCI Express interface block (which is composed of HSSI 240 and HIP 250) must send data to configuration state machine 250 over communication link(s) 270 in order for configuration to occur. Configuration state machine 250 then sends instructions to distributed configurable memory 260, over one or more communication links 310, to configure the device. While the number of wires or other transmission medium required to create communication link(s) 270 may vary, sufficient wires or other transmission medium to transmit data received in each lane of serial link 120 to configuration state machine 250. This may require a TX/RX pair of wires for each lane of data received by HSSI 240 in some embodiments.

As PCI Express and other high speed serial link protocols have become increasingly popular, one challenge facing developers of configurable slave devices such as FPGA device 130 is insuring that the configurable device is capable of interacting with high speed links having more and more lanes. Frequently, the response has been to create configurable devices which contain, among other things, a substantial amount of infrastructure in terms of medium to support communication link(s) 270 that connect the PCI Express interface block (composed, for example, of HSSI 240 and HIP 250) with configuration state machine 250.

However, having a large number of wires or other medium connecting configuration state machine 250 to HSSI 240 and HIP 245 can itself present significant challenges in terms of designing a configurable device. For example, configuration state machine 150 will have to be located on slave device 130 in a location where a number of links can be connected. Also, during fabrication, care will have to be taken to insure that all of the wires in communication links) are properly constructed, to minimize transmission skew, and to minimize signal interference between the different wires, among other things.

Further, only one HSSI 140 is shown in FIG. 2, but typically, there are multiple high speed serial interfaces (HSSI's) 140 on a configurable device. Thus the design and fabrication problems of supporting communication link(s) 270 shown in FIG. 2 will be compounded in an actual configurable device. And that challenge will only increase as more lanes are added to high speed serial links as is likely to occur in the future.

Figure 4:
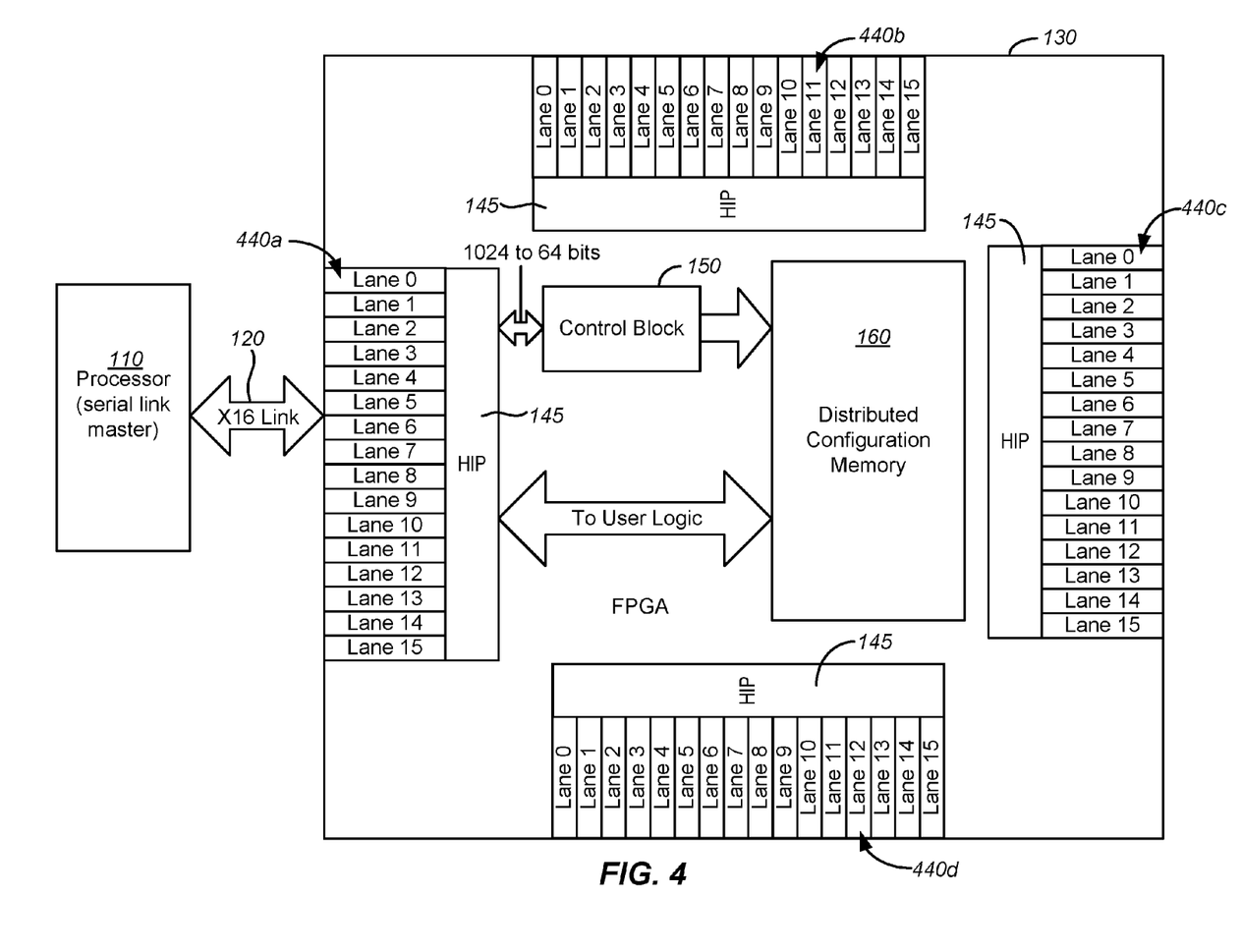
FIG. 4 is a simplified block diagram of a master device and a slave configurable device according to an embodiment of the present disclosure.

FIG. 4 is a simplified block diagram showing an example embodiment of a high speed serial link system connecting a master device to a slave device. Slave configurable device 130 is shown in this Figure as having multiple HSSI interfaces 240*a-d*.

In this embodiment, each HSSI 440*a-d* receiving configuration data may need to be connected to configuration state machine 250 in order for proper configuration to occur.

Locating the HSSI's so they are contiguous to one another may partially address the challenges of having multiple communication lines 270 providing configuration data to configuration state machine 250. However, this solution may require more silicon area, increase the costs associated with designing and fabricating the device, and otherwise complicate the process of developing slave configurable device 130.

For example, HSSI's are as a general rule placed on the boundaries of a device where it is generally most efficient to locate interfaces to other devices. Thus requiring that they are all contiguous to one another can be difficult.

As shown in FIG. 4, HSSI 440*a* is located on the left edge of the device. HSSI 440*b* is located on the right edge of the device. HSSI 440*c* is located on the top edge of the device. HSSI 440*d* is located on the bottom edge of the device As noted above, during normal operation, it is usually desirable to send data on as many links as possible in order to provide faster performance. For purposes of configuration, however, as shown above, sending the configuration related data on many links can actually pose significant problems for the slave device, because the slave device is then forced to support communications between the entry point of each lane of the serial link, and the slave device's configuration state machine.

Insuring that data from each of HSSI's 440*a-d* reach configuration state machine 250 at the same time becomes a harder challenge. The design and fabrication challenges created by trying to link each HSSI 440*a-d* to configuration state machine 150 can in some cases become impractical from either a cost and efficiency perspective.

Accordingly, the inventors have devised a system where slave device 130 negotiates a connection with master device 110 with fewer data lanes for us during configuration mode, and then, after configuration has been completed, renegotiating the connection to include a larger number of lanes for use during normal operations mode.

Figure 5:
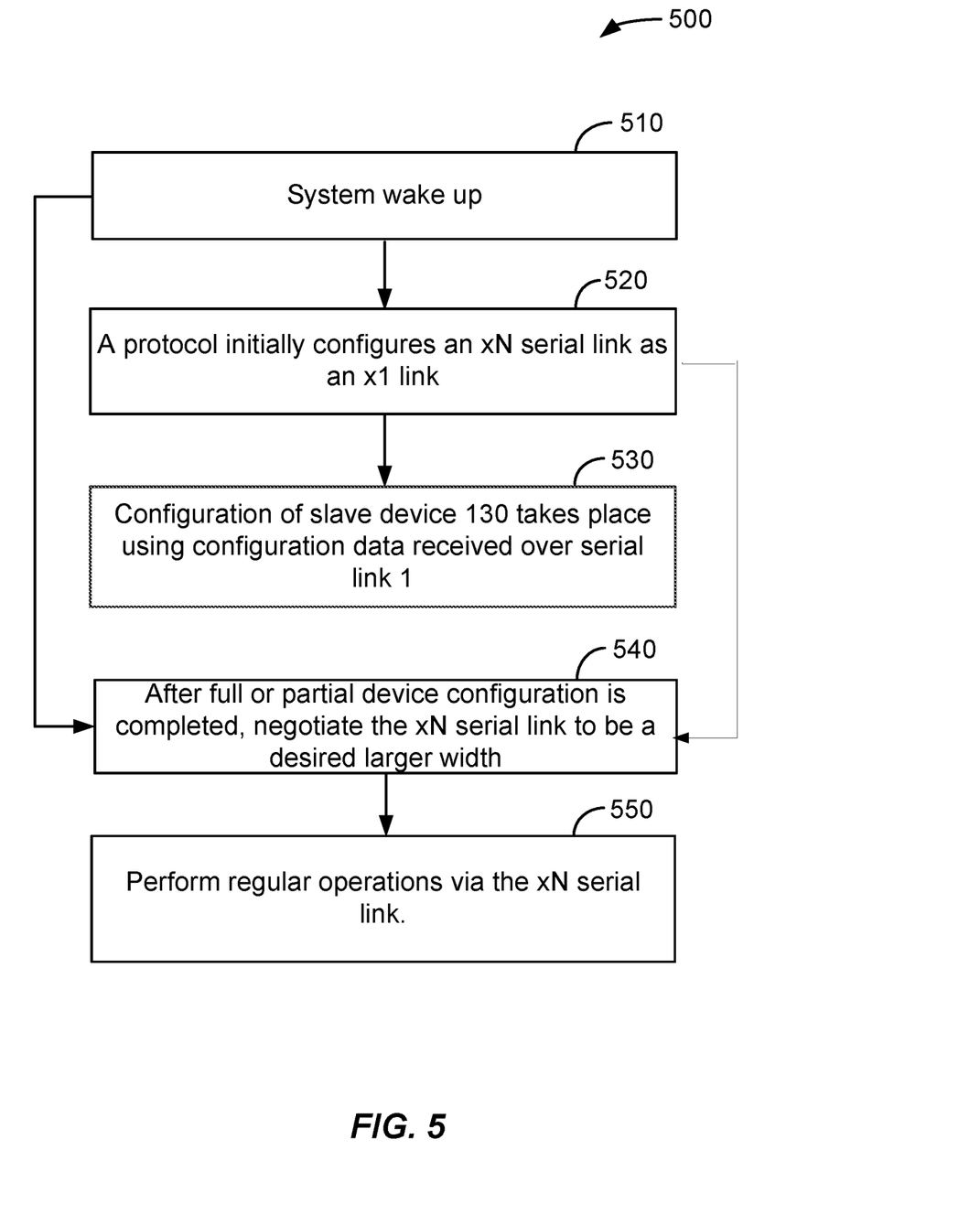
FIG. 5 is a simplified high-level flowchart depicting different features of an example method according to an embodiment of the present disclosure.

FIG. 5 is a simplified high-level flowchart depicting different features of an example method according to an embodiment of the present disclosure.

According to an embodiment of the present disclosure, at 510, a system wake up occurs.

At 520, a protocol, for example, Serial Lite, or a user state machine at slave device 130 initially configures an xN serial link (for example, high speed serial link 120) as an x1 link, that is, a link that uses one lane. Note that the configuration may take place with one lane, or with another minimal link width supported by the high speed serial link protocol. The important factor for purposes of various embodiments of the present disclosure is that the link width for configuration, is smaller than the link width used after configuration is completed for use during normal operation. Note that the configuration at issue may be full or partial configuration (partial reconfiguration for example may involve reconfiguration of only a subset of the blocks configured during full configuration); initial configuration or later reconfiguration (later reconfiguration may involve a later full or partial reconfiguration of blocks of configurable memory to perform a different function).

At 530, configuration of slave device 130 takes place using configuration data received over serial link 120. The configuration data is transmitted over the single lane of serial link 120 configured at 520.

At 540, after full or partial device configuration is completed, the slave device 130 negotiates the xN serial link to be a desired larger width (where N=2, 4, 8, 16, for example). That is, during configuration mode, a first link width is used, and then the link width is expanded to a desired link width for use during the general operations mode where the master device is interacting with the configured slave device.

At 550, regular operations during the first operations mode using the xN serial link.

The above embodiment of the present disclosure enables, for example, FPGA configuration via PCI Express in a single lane configuration. Further, the embodiment allows the different lanes of x16 link 120 to be physically non-contiguous, which is also useful for implementation modularity and flexibility.

According to other embodiments of the present disclosure, a protocol such as PCI Express may also be used with system firmware. Described below is a simplified high-level depiction of different features of an example method according to such an embodiment of the present disclosure.

In such an embodiment there is a system wakeup.

Configuration is performed via PCI-Express aware firmware in a PCI-Express root complex in master device 110 programs slave configurable device 130 via a given lane width serial link, for example, a x8 link.

The firmware re-negotiates the link to a larger lane width serial link, for example, a x16 link.

Embodiments of the present application provide advantages in designing and fabricating configurable devices such as slave configurable device 130 which have the capability to connect with high speed serial links, by reducing the area of a configurable device required to support connections 270 between HSSI 240 and configuration state machine 250, as well as reducing nonrecurring expenses associated with the design and fabrication of configurable device chips.

Further, embodiments of the present application remove the need to have contiguous HSSI 440 or HIP 445 blocks. This has the benefit of reducing acute signal congestion at the interface due to sharing of core fabric signals between multiple HIP and HSSI channels. Further, it removes the challenge of coordinating the timing issues relating to HSSI to core data transfer, as well as the associated challenges involved in IP integration.

Further, embodiments of the present application provide the advantage that they provide an approach to configuration of a programmable device using a serial link that could be readily applied to different types of programmable devices, thus offering a solution that could become a general standard.

Figure 6:
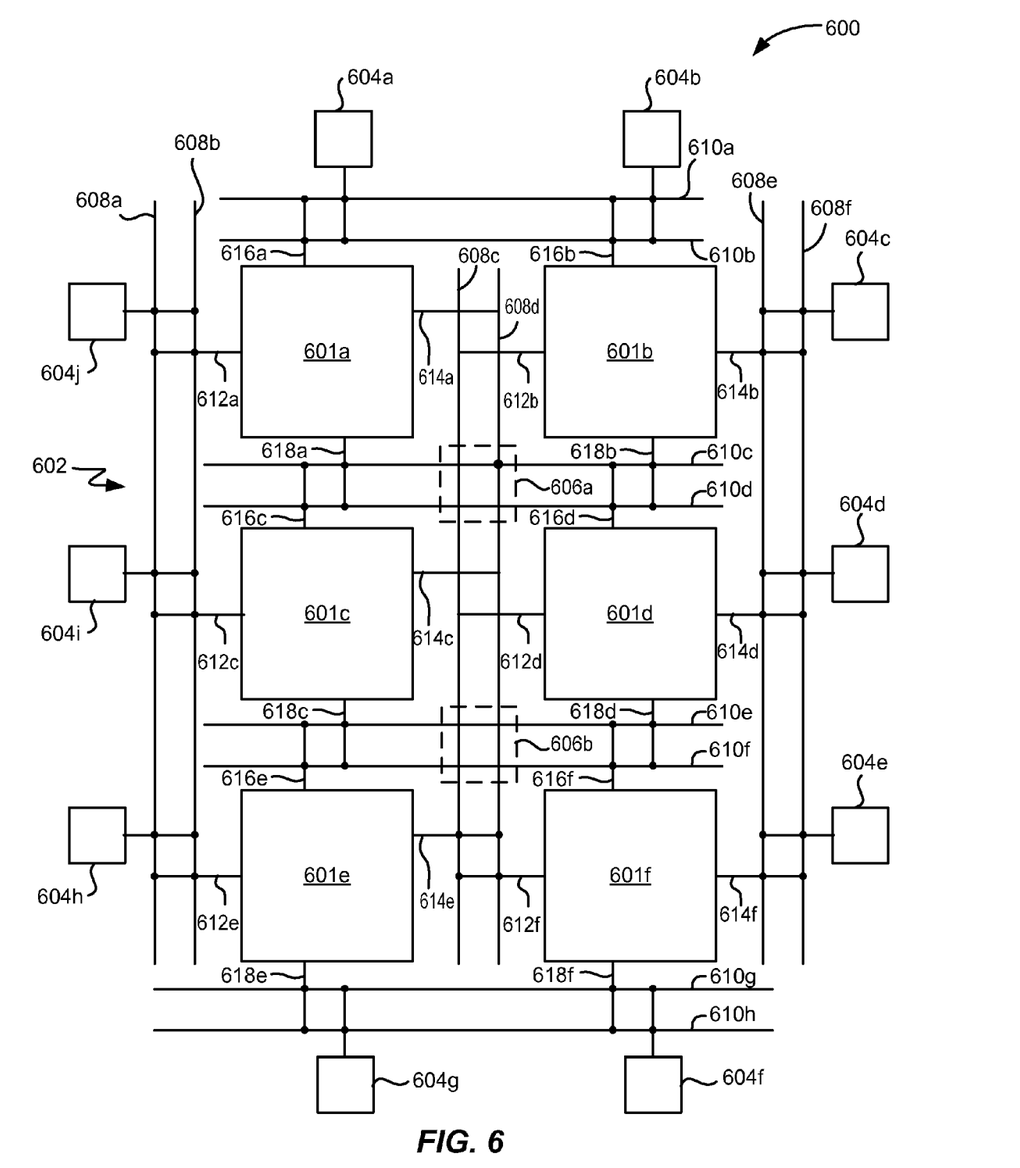
FIG. 6 is a simplified block diagram of a programmable logic device according to an embodiment of the present disclosure.

As noted above, various embodiments of the present disclosure may be used to design electronics components, including, for example, a programmable logic device (PLD). FIG. 6 illustrates a PLD which may be designed using techniques and mechanisms described in the present disclosure.

A PLD may comprise a plurality of logic array blocks containing logic elements (LEs), look up tables (LUTs), and other elements, which a user may use as building blocks to implement desired features. For example, referring to FIG. 6, a programmable logic device (PLD) 600 may be a field programmable gate array (FPGA). In various embodiments, PLD 600 may include multiple logic array blocks 601 (LABs), a routing architecture 102, multiple input/output (IO) pads 104, and switches 606. It is appreciated that one or more of the LABs 601 and switches 106 may be configured using configuration data. LABs 601 may be coupled to each other via the routing architecture 602 and/or one or more switches 606. The routing architecture 602 may include multiple vertical LAB lines 608 and multiple horizontal LAB lines 610. LABs 601 may have one or more LAB inputs 612 and one or more LAB outputs 614. LABs 601 may also have, in the vertical direction, one or more LAB inputs 116 and one or more LAB outputs 618. It is noted the signals may also go in the opposite direction with the items designated 612 and 616 representing LAB outputs, and the items designated 614 and 618 representing LAB inputs. IO pads 604 may be coupled to the routing architecture 602.

In one embodiment, LAB 601a may receive an input signal from IO pad 604j through the LAB input 612a. In some embodiments, the LAB 601b may receive an input signal from another LAB, e.g., LAB 601a via LAB input 612b. It is appreciated that LAB 601b may output the received signal via LAB output 614b to the IO pad 604c. The IO pad 604c may send the output signal to an off-chip device (not shown). In certain embodiments, the off-chip device may be located on a chip separate from a chip on which PLD 600 may be located.

Although six LABs 601 are shown in FIG. 6, it is noted that in various embodiments, PLD 600 may include a different number of LABs 601. Moreover, although ten IO pads 604 are shown in FIG. 6, in some embodiments, a different number of IO pads 604 may be used.

Any of LABs 601 may include one or more logic elements (LEs). The logic elements may include n-input look-up tables, flip-flops, such as a D flip-flop or a JK flip-flops, one or more multiplexers, among other things.

Some PLDs provide some blocks of one or more LABs 601 which are configured to perform certain functions which a user may find useful. For example, a PLD might be configured such that a group of LUTs, flip flops and other elements of a PLD are designed to implement an IO interface, a transceiver, a memory controller, or some other desired functionality. In some embodiments, such a functional block may use one or more LABs that span multiple rows and/or multiple columns within a PLD.

While the disclosure has been particularly shown and described with reference to specific embodiments thereof, it will be understood by those skilled in the art that changes in the form and details of the disclosed embodiments may be made without departing from the spirit or scope of the disclosure. For example, embodiments of the present disclosure may be employed with a variety of network protocols and architectures. It is therefore intended that the disclosure be interpreted to include all variations and equivalents that fall within the true spirit and scope of the present disclosure.

What is claimed is:

1. A method for configuring a device using a serial link, comprising:

a slave device negotiating a serial link comprising a first number of serial lanes with a master device for use during a first configuration mode;

a serial interface of the slave device receiving configuration data from the master device over the serial link, processing the data into a form usable by the slave device, and transmitting the data to slave configuration circuitry in the slave device, and the slave configuration circuitry using that configuration data to configure distributed configuration blocks in the slave device to implement a function, wherein the slave configuration circuitry is connected to the serial interface by a plurality of communication links, and wherein a number of the plurality of communication links between the slave configuration circuitry and the serial interface corresponds to the first number of serial lanes between the master device and the slave device;

after configuration is complete, the slave device negotiating a second number of serial lanes for the serial link between the master device and the slave device during a first operations mode;

the slave device exchanging data with the master device over the serial link while the slave device performs the function for which the slave device has been configured;

wherein the first number of serial lanes to provide the configuration data to implement the function is smaller than the second number of serial lanes to provide the data to perform the function.

2. The method of claim 1, wherein the serial link is a PCI Express link.

3. The method of claim 1, wherein the slave device is a Field Programmable Gate Array (FPGA).

4. The method of claim 1, further comprising, after the first operations mode, the slave device entering a second configuration mode; and during the second configuration mode, the slave device negotiating a third number of serial lanes for the serial link between the master device and the slave device;

the slave device receiving reconfiguration data over the serial link and using that reconfiguration data to configure distributed configuration blocks in the slave device;

after reconfiguration is completed, the slave device negotiating a fourth number of serial lanes for the serial link between the master device and the slave device;

the slave device exchanging communications with the master device over the serial link during a second operations mode while the slave device performs a function for which the slave device has been configured;

wherein the third number of serial lanes is smaller than the second number of serial lanes, and wherein the third number of serial lanes is smaller than the fourth number of serial lanes.

5. The method of claim 4, wherein the configuration blocks configured during the second configuration mode comprise a subset of the configuration blocks configured during the first configuration mode.

6. The method of claim 4, wherein the configuration blocks configured during the second configuration mode comprise a same set of configuration blocks configured during the first configuration mode.

7. The method of claim 1, wherein the serial interface of the slave device acts as an interface for receiving and sending data over the serial link to the master device, and wherein the serial interface monitors whether the slave device is in the first configuration mode or in the first operations mode, and, depending on which mode the slave device is operating in, negotiates the serial link with a first or second number of serial lanes, with the master device.

8. The method of claim 1, wherein the first number of serial lanes is a minimal link width supported by the protocol used to create the serial link.

9. An apparatus for configuring a device using a serial link, comprising:
memory;
interfaces; and
a processor, the processor configured to:
negotiate a serial link comprising a first number of serial lanes with a master device for use during a first configuration mode;
receive, via a serial interface, configuration data from the master device over the serial link, processing the configuration data into a form usable by the slave device, and transmitting the configuration data to slave configuration circuitry in the slave device, and the slave configuration circuitry using that configuration data to configure distributed configuration blocks in the apparatus to implement a function, wherein the slave configuration circuitry is connected to the serial interface by a plurality of communication links, and wherein a number of the plurality of communication links between the slave configuration circuitry and the serial interface corresponds to the first number of serial lanes between the master device and the slave device;
after configuration is complete, negotiate a second number of serial lanes for the serial link between the master device and the apparatus during a first operations mode;
exchange data with the master device over the serial link while apparatus performs the function for which the apparatus device has been configured;
wherein the first number of serial lanes to provide the configuration data to implement the function is smaller than the second number of serial lanes to provide the data to perform the function.

10. The apparatus of claim 9, wherein the serial link is a PCI Express link.

11. The apparatus of claim 9, wherein the slave device is a Field Programmable Gate Array (FPGA).

12. The apparatus of claim 9, wherein the processor is further configured to
after the first operations mode, enter a second configuration mode; and
during the second configuration mode, negotiate a third number of serial lanes for the serial link between the master device and the apparatus;
receive reconfiguration data over the serial link and using the reconfiguration data to configure distributed configuration blocks;
after reconfiguration is completed, negotiate a fourth number of serial lanes for the serial link between the master device and the apparatus;
exchange communications with the master device over the serial link during a second operations mode while the apparatus performs a function for which the apparatus has been configured;
wherein the third number of serial lanes is smaller than the second number of serial lanes, and
wherein the third number of serial lanes is smaller than the fourth number of serial lanes.

13. The apparatus of claim 12, wherein the configuration blocks configured during the second configuration mode comprise a subset of the configuration blocks configured during the first configuration mode.

14. The apparatus of claim 9, wherein the serial interface of the slave device acts as an interface for receiving and sending data over the serial link to the master device, and wherein the serial interface monitors whether the apparatus is in the first configuration mode or in the first operations mode, and, depending on which mode the apparatus is operating in, negotiates a first or second number of serial lanes for the serial link, with the master device.

15. The apparatus of claim 9, wherein the first number of serial lanes is a minimal link width supported by the protocol used to create the serial link.

16. At least one non-transitory computer readable storage medium having computer program instructions stored thereon, the computer program instructions arranged to perform the following operations:
a slave device negotiating a serial link comprising a first number of serial lanes with a master device for use during a first configuration mode;
a serial interface of the slave device receiving configuration data from the master device over the serial link, processing the configuration data into a form usable by the slave device, and transmitting the configuration data to slave configuration circuitry in the slave device, and the slave configuration circuitry using that configuration data to configure distributed configuration blocks in the slave device to implement a function, wherein the slave configuration circuitry is connected to the serial interface by a plurality of communication links, and a number of the plurality of communication links between the slave configuration circuitry and the serial interface corresponds to the first number of serial lanes between the master device and the slave device;
after configuration is complete, the slave device negotiating a second number of serial lanes for the serial link between the master device and the slave device during a first operations mode;
the slave device exchanging data with the master device over the serial link while the slave device performs the function for which the slave device has been configured;
wherein the first number of serial lanes to provide the configuration data to implement the function is smaller than the second number of serial lanes to provide the data to perform the function.

17. The method of claim 1, wherein the slave configuration circuitry comprises a slave configuration state machine.

18. The apparatus of claim 9, wherein the slave configuration circuitry comprises a slave configuration state machine.

19. The apparatus of claim 9, wherein serial lanes of the serial link are configured to be non-contiguous.

20. The at least one non-transitory computer readable storage medium of claim 16, wherein the slave configuration circuitry comprises a slave configuration state machine.

21. The at least one non-transitory computer readable storage medium of claim 16, wherein the slave configuration circuitry partially reconfigures the distributed configuration blocks.

22. The at least one non-transitory computer readable storage medium of claim 16, wherein serial lanes of the serial link are configured to be non-contiguous.

\* \* \* \* \*